(12) United States Patent
Gavrilovich

(10) Patent No.: US 7,221,904 B1
(45) Date of Patent: May 22, 2007

(54) MOBILE COMMUNICATION SYSTEM WITH MOVING BASE STATION

(75) Inventor: Charles D. Gavrilovich, Naperville, IL (US)

(73) Assignee: Carucel Investments, L.P., Park Ridge, IL (US)

( * ) Notice: Subject to any disclaimer, the term of this patent is extended or adjusted under 35 U.S.C. 154(b) by 0 days.

(21) Appl. No.: 09/401,584

(22) Filed: Sep. 22, 1999

Related U.S. Application Data

(63) Continuation of application No. 08/953,962, filed on Oct. 20, 1997, now Pat. No. 6,026,277, which is a continuation of application No. 08/687,722, filed as application No. PCT/US95/07037 on Jun. 2, 1995, now Pat. No. 5,729,826.

(51) Int. Cl.
*H04B 7/15* (2006.01)
(52) U.S. Cl. .................. 455/11.1; 455/436; 455/426.2
(58) Field of Classification Search ............. 455/11.1, 455/422, 436, 446, 456, 512, 422.1, 456.1; 342/106, 109, 114, 139, 140, 146, 357
See application file for complete search history.

(56) References Cited

U.S. PATENT DOCUMENTS

| | | | | |
|---|---|---|---|---|
| 4,539,706 A | * | 9/1985 | Mears et al. .................. 455/11 |
| 5,058,201 A | * | 10/1991 | Ishii et al. ..................... 455/33 |
| 5,109,390 A | * | 4/1992 | Gilhousen et al. .......... 370/335 |
| 5,282,239 A | * | 1/1994 | Yokoi et al. ................. 455/465 |
| 5,384,824 A | * | 1/1995 | Alvesalo ....................... 379/59 |
| 5,404,570 A | * | 4/1995 | Charas et al. ................. 455/22 |
| 5,640,443 A | * | 6/1997 | Kamura ....................... 455/433 |
| 5,729,826 A | * | 3/1998 | Gavrilovich ............... 455/11.1 |
| 6,026,277 A | * | 2/2000 | Gavrilovich ............... 455/11.1 |

* cited by examiner

*Primary Examiner*—Temica Beamer
*Assistant Examiner*—Joy Contee
(74) *Attorney, Agent, or Firm*—Gavrilovich, Dodd & Lindsey, LLP; Charles D. Gavrilovich, Jr.

(57) ABSTRACT

A mobile communication system employs moving base stations moving in the direction of flow of traffic moving along a roadway. The moving base station communicates with fixed radio ports connected to a gateway office. A plurality of moving base stations are spaced apart on a closed loop and move with the flow of traffic along one roadway on one leg of the loop and with a flow of traffic on another roadway in another leg of the loop. The moving base stations communicate with a plurality of fixed radio ports connected by a signal transmission link to a gateway office which, in turn, is connected to the wire line network. The moving base stations are each provided with a pair of directional antennas with one antenna directed toward the flow of traffic and another antenna directed to the fixed radio ports.

69 Claims, 5 Drawing Sheets

MOBILE COMMUNICATION SYSTEM WITH MOVING BASE STATION

RELATED APPLICATIONS

This application is a continuation of U.S. application Ser. No. 08/953,962, filed Oct. 20, 1997, which is a continuation of U.S. application Ser. No. 08/687,722, filed Jul. 26, 1996, now U.S. Pat. No. 5,729,826, which is a national phase application of PCT/US95/07037, filed Jun. 2, 1995.

BACKGROUND OF THE INVENTION

1. Field of the Invention

The invention relates to cellular telephone systems in which a mobile unit communicates by wireless communication to a base station connected to the wire telephone network and more particularly to cellular telephone systems adapted for use with fast-moving mobile units.

2. Background Art

In a typical cellular telephone system, an area is divided into a plurality of cells with each cell having a centrally located cell site. A mobile unit moving in such a cellular network communicates by radio with a nearest cell site. The cell sites are each connected by cable or point-to-point microwave to a telephone network interface. The network interface typically provides communication among cell sites and between the cell sites and the so-called wire line telephone network. The functions of a typical network interface are described in The Bell System Technical Journal, January 1979, Volume 58, No. 1. One of the functions to be performed by the telephone network interface is the so-called "handoff" function. As a mobile unit moves through a cellular network, it will move away from one cell site and toward another cell site. Each cell site monitors signal quality of the signal received from the mobile unit and passes information to the telephone network interface and determines when a call in progress is to be transferred from one cell site to another. This procedure is known as "handoff". The handoff process involves several operations including selecting a cell site trunk between the MTSO and the new cell site, sending a message to the mobile unit transmitter/receiver to tune from its present voice channel to a voice channel in the new cell site corresponding to the newly selected trunk, setting up a talking path in the MTSO from the cell site trunk to the trunk of the telephone network presently in use in the call, and idling the talking path in the switching network in the MTSO between the old cell trunk and the telephone network trunk assigned to the call.

A problem with existing mobile telephone systems is the considerable time required in handoffs. This becomes a particular problem in urban areas which are highly congested. A basic principle of cellular telephone systems is the concept of frequency reuse. It can be shown that traffic capacity of a cellular system is increased by a factor $N^2$ as the size of the cell, i.e., its diameter, is decreased by a factor of N. This is due to the fact that, at least in principle, all frequencies in the mobile telephone spectrum are available for use in each independent cell. Thus, as the number of cells is increased, the total number of calls that can concurrently exist in an area is increased. A drawback, however, to decreasing the size of the cells is that a mobile unit tends to cross cell boundaries more often, requiring a larger number of handoffs which will tend to overload the mobile telephone switching office (MTSO) to the point where existing calls may be interrupted or dropped.

Personal communication service (PCS) functions in substantially the same manner as the mobile cellular system. In PCS, the user may be in a building or walking in a street or riding a vehicle and using a handset which communicates with a base station in the same manner that the mobile unit communicates with the base station or cell site in the cellular network. It is envisioned that PCS, by implementing very small cells, could provide service to a very large number of users, for example in a densely populated urban area. The difficulty with PCS is the same as in the cellular system in that handoffs become the bottleneck.

Modern cellular systems use what is known as code division multiple access (CDMA) spread-spectrum communications. In direct-sequence coding CDMA (DS-CDMA), the energy of the user signal is distributed uniformly over the system bandwidth through the spreading process providing separation between users of the same frequency in adjacent cells. A requirement of DS-CDMA is that no interfering signal received may be significantly stronger than the desired signal since it would jam the weaker signal. This type of coding is used in what is sometimes referred to as hierarchal cell structures. The most commonly referenced hierarchal structure is a macro/umbrella cell overlaying a number of micro cells. A fast-moving mobile unit, for example, may be served by the macro cell to avoid an extreme number of handovers. Slow-moving users are allocated to micro cells to save capacity for the macro cells. Using the DS-CDMA concept, micro cells and macro cells share the same frequency. To avoid strong interference at a micro cell from mobile unit in communication with a macro base station, the output power of the mobile unit in the micro cell is increased to overpower the interfering signal. The use of hierarchal cell structure to provide high-quality speech, data communication at rates up to 2 megabits per second and video communication with mobile units travelling at rates in excess of 100 miles per hour and accommodating PCS are seen as needed to meet future mobile telecommunication demands.

In the hierarchal cell structure, the low tier, small cells, e.g., on the order of 100 feet in diameter, accommodate low speeds. The low speed is mostly pedestrian traffic and other traffic moving at speeds below 30 miles per hour. The advantages of small cells is low power, simple, inexpensive and light-weight terminals. What is desirable is an infra structure which allows use of such terminals in all applications, whether in the home or office as a cordless phone, on streets, in shopping malls, airports, etc., and in cars on expressways at highway speeds. Additionally, high-spectrum reuse is needed to provide low-cost, high-quality service which requires a large bandwidth for each subscriber.

To provide wire line toll, quality-voice service, a 32-kilobit per second bit rate is required with ADPCM coders. As wireless data services emerge, even more spectrum bandwidth will be required. In the future, it may be possible to utilize the spectrum in the 60 gigahertz range providing very large amounts of bandwidth. However, the radio wave characteristics at that frequency dictate a very short range, line of site propagation, requiring very small cells. However, as noted, small cells and fast-moving mobile units are incompatible due to the time required for handoff.

SUMMARY OF THE INVENTION

These and other problems of the prior art are overcome in accordance with this invention by means of a moving base station which is interposed between a moving mobile telephone unit and a fixed base station. In accordance with this invention, a movable base station moves with the traffic at a rate of speed which is comparable to the speed of the traffic and communicates with a moving mobile telephone unit via standard mobile radio transmission. The movable base station further communicates by radio signals with a plurality of fixed antennas spaced along the path of travel of the mobile base station. The several fixed antennas are connected to a telephone wire line network via a telephone gateway office in a standard fashion. In accordance with this invention, the fixed radio ports are synchronized and the interface between the moving base station and the fixed radio ports is a time division multiplexed (TDM)-direct-sequence, spread-spectrum CDMA.

In one particular embodiment, a number of fixed base stations are provided in addition to moving base stations allowing slower moving traffic, such as pedestrian traffic or rush hour mobile traffic to communicate via the fixed base stations.

In a specific embodiment of the invention, the moving base stations are provided with highly directional antennas directed to moving traffic and highly directional antennas directed to the radio ports. Communications from the fixed radio ports to the movable base stations are at a relatively low power level and from the movable base stations to the mobile units are at a relatively higher power level. Due to the characteristics of the direct-sequence, spread-spectrum CDMA, the higher power level signal will overpower the lower level signal such that the mobile unit does not receive communications from the fixed radio port but only from the movable base station. In the reverse direction, a low level of signal is transmitted from the mobile units to the movable base station and a high-level signal is transmitted from the base station to the fixed radio ports, thereby eliminating any direct communication from the mobile unit to the fixed radio port.

In one embodiment of the invention, the movable base stations are supported on a series of closed loops and ends of adjacent loops overlap to facilitate transfer of telephone calls between adjacent loops.

DETAILED DESCRIPTION

Figure 1:
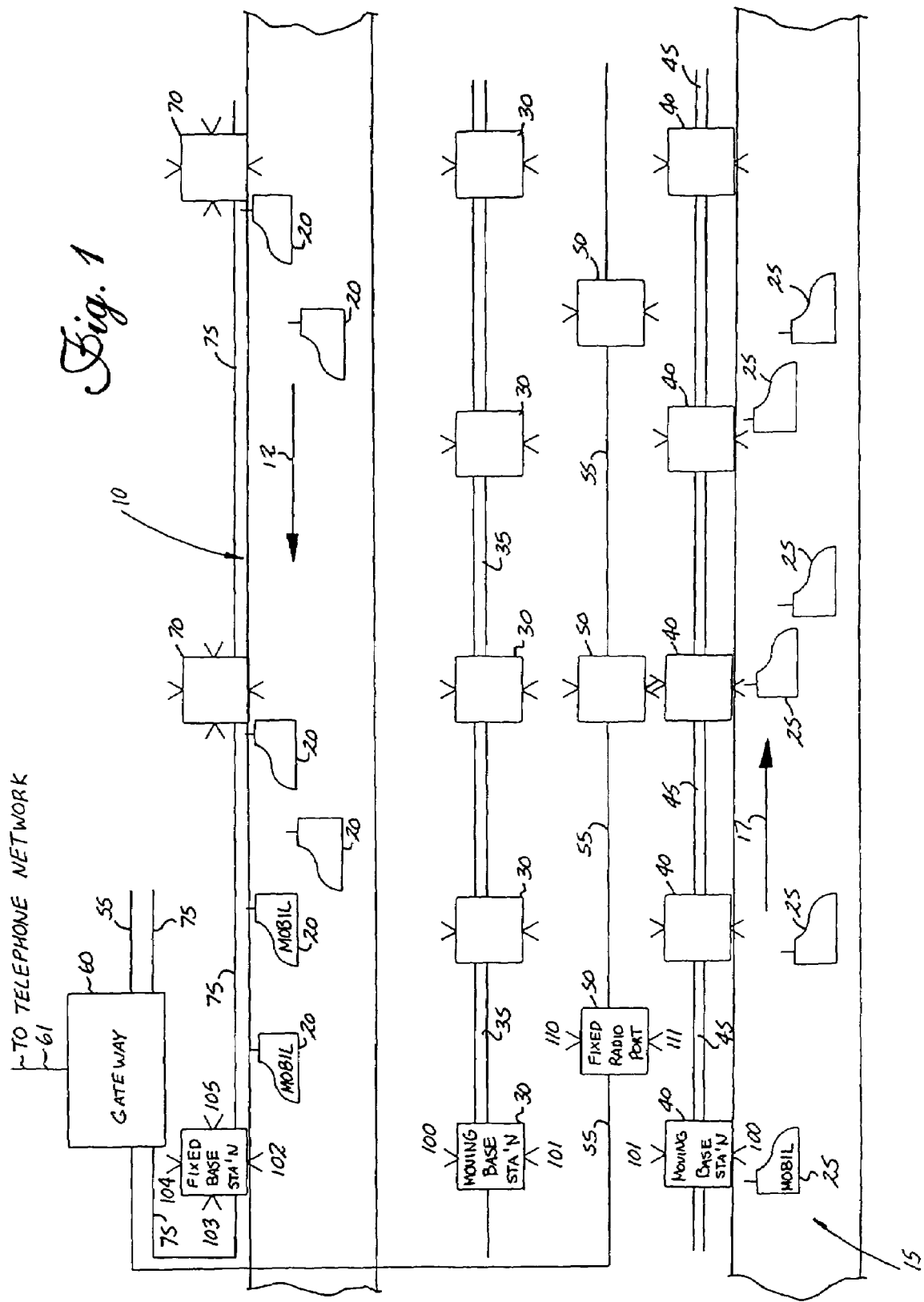
FIG. 1 is a block diagram representation of a roadway structure with fixed base stations, moving base stations, and fixed radio ports.

FIG. 1 is a diagrammatic representation of a mobile telecommunication system incorporating principles of the invention. FIG. 1 represents, for example, a divided highway with mobile units 20 traveling on a first roadway 10 in one direction and a plurality of mobile units 25 traveling along a second roadway 15, in the opposite direction. A plurality of moving base stations 30 are disposed along one side of the roadway 10. The base stations are spaced apart by a selected distance equivalent to the diameter of the cell served by the moving base station. The moving base stations 30 may be moved by means of a rail 35, or other suitable conveying device which may include an automotive vehicle travelling on the roadway, in the same direction as the traffic flow on the roadway 10, as indicated by the arrow 12. In a similar fashion, a plurality of moving base stations 40 are disposed adjacent the roadway 15 moving in the direction of the traffic as indicated by the arrow 17. The moving base stations 40 are moved along a rail 45. The moving base stations 30, 40 may be supported on any suitable conveying device such as rails 35, 45. The conveying device may be at ground level or overhead, depending on the terrain and available space for the device. The moving base stations are preferably disposed for optimum radio communication with the mobile units on the roadways.

Disposed between the moving base stations moving along the rails 35, 45 are a plurality of fixed radio ports 50 which are connected by means of a fiber optic ring 55 or a similar signal transmitting device to a telephone office connected to the wire line telephone network and referred to as a gateway office. The gateway office 60 forms the interface between the mobile telecommunication system and the wire line telephone network. The gateway office is a well-known equipment. It is part of the telephone network and is responsible for call processing in conjunction with the base stations. As described further later herein, the gateway office will include certain processor hardware and software to detect a best signal quality indication and to selectively transmit information with a best signal quality indicator to the telephone network. A plurality of fixed base stations 70 are disposed in the vicinity of the roadway 10 and are connected to the gateway office 60 by means of a fiber optic ring 75 or similar signal transmission device.

In operation, the moving base stations 30 may move in the direction of the flow of the traffic at a rate of, for example, 60 miles per hour, which may be faster than some traffic and slower than other traffic. The moving base station preferably handles telecommunications with mobile units which travel at a rate of not more than 30 miles per hour faster or slower than the moving base station. For example, the moving base stations 30, 40 may be traveling at the rate of 60 miles per hour to accommodate traffic moving in the range of 30 to 90 miles per hour. In the arrangement of FIG. 1, fixed base stations 70 would accommodate communications with mobile units traveling at a speed of less than 30 miles per hour including pedestrian traffic and stationary units. It will be readily apparent that instead of having fixed and moving base stations as depicted in FIG. 1, slowly moving and rapidly moving units may be used as well. A particular moving base station is effective when the mobile units are moving in the same direction as a base station. FIG. 1 shows two roadways traveling in opposite directions with the moving base stations disposed between moving in the direction of the traffic. The base stations may also be placed on opposite sides of the same roadway with two-way traffic with the moving base stations moving in opposite directions on the opposite sides of the roadway.

In the typical cellular telephone system, the base station, also referred to as a cell site, forms an interface between the mobile unit and the gateway office. As such, the base stations may perform a number of functions, including functions such as locating a particular mobile unit, as well as voice processing and functions associated with call setup, call supervision, and call termination. Additionally, the base stations perform the function of handing off and receiving an existing call involving a mobile unit which has moved into or out of the normal service area of a base station. All of these are well-known base station functions. In some proposed mobile telephone systems, the base stations are primarily only radio interface units and a base station controller, connected to a plurality of base stations performs call-handling functions for the plurality of base stations. The system in accordance with the invention differs from the prior art primarily in that the base stations 30, 40 are moving with the traffic and communicate with the gateway office 60 via fixed radio ports 50. Furthermore, the various call-handling functions, including handoff, are performed by the moving base station.

Advantageously, because of movement of the base station in the same direction as the traveling mobile unit, the number of handoffs is greatly reduced.

Each of the moving base stations 30, 40 is provided with antennas 100, 101. The antennas 100, 101, preferably high gain, directional antennas for use in mobile communication, are well know and commercially available. The fixed base stations 70 are provided with four separate antennas 110 extending in four different directions. The antennas 100 on the base stations 30, 40 are used to communicate with the mobile units 20, 25 whereas the antennas 101 on the moving base stations 30, 40 are used to communicate with the fixed radio ports 50. The fixed base stations 70 are preferably each provided with four antennas 102–105. Fewer than four antennas may also be used. In that case, at least one omni-directional antenna is used. In the configuration of FIG. 1, the antennas 102 are arranged to communicate with the mobile units 20 and the antennas 103–105 are arranged to communicate with other mobile telephone communications from slow moving traffic or stationary subscribers. The fixed radio ports 50, in the configuration of FIG. 1, are each provided with a pair of directional antennas 110, 111 of the same general type as the directional antennas 100–105. As the moving base stations 30, 40 move relative to the fixed radio ports 50, data representing voice signals and call related information is transmitted between the antennas 101 on the moving base stations 30, 40 and the antennas 110, 111 on the fixed radio ports 50.

Figure 2:
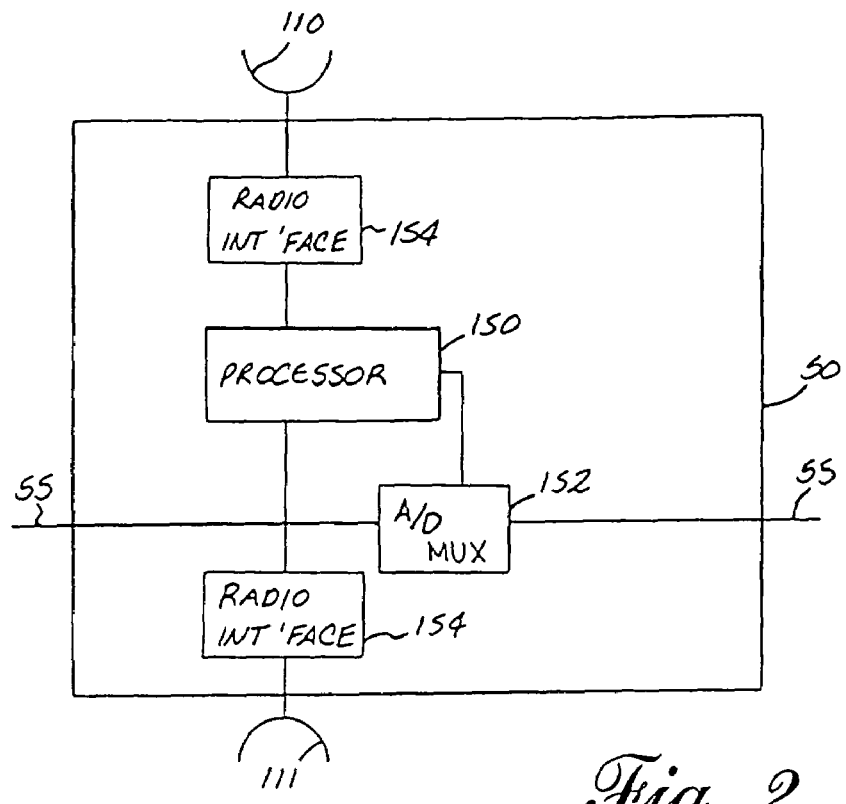
FIG. 2 is a block diagram representation of a fixed radio port of FIG. 1.

FIG. 2 is a diagrammatic representation of the fixed radio ports 50. The unit includes a standard microprocessor 150 as well as a radio interface circuit 154 providing an interface between the radio signals received on the antennas 110, 111 and the processor 150. The circuits are of a type typically used in fixed base stations and are well known in the art. Additionally, each radio port 50 includes a processor 150 connected to an add/drop multiplexer (ADM) 152. The ADM 152 interfaces with the fiber optic cable 55 and is able to add data from the processor 150 to the data stream on the fiber optic cable 55. Additionally, the ADM 152 recognizes a data stream accompanied by an address identifying the processor 150 and transfers such data from the data stream of the fiber optic cable 55 to the processor 150. As will be described further later herein, the processor 150 computes a signal quality indicator for the information received from the radio interface circuits 154, based primarily on radio signal strength intensity, in a well-known fashion. Processor 150 controls the transfer information between the fiber optic cable 55 and the various moving base stations via the antennas 110, 111.

Figure 3:
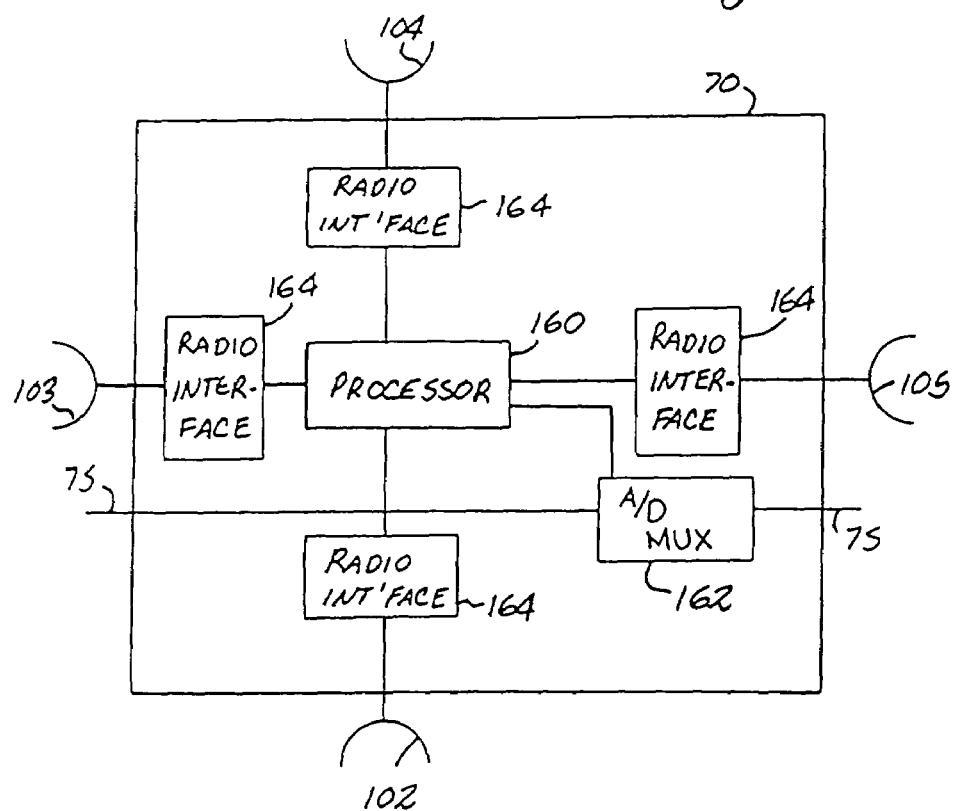
FIG. 3 is a block diagram representation of a fixed base station of FIG. 1.

FIG. 3 is a block diagram representation of one of the fixed base stations 70. The fixed base stations 70 perform the functions of a standard prior art fixed base station. The base stations 70 are connected to the fiber optic ring 75 and include an add/drop multiplexer (ADM) 162 which provides an interface between the processor 160 and the fiber optic ring 75.

As mentioned earlier, both the optical ring 55 and optical ring 75 are connected to the gateway office 60. The primary function of the gateway office is to provide the interface to a wired telephone network. It distributes the telecommunications traffic between the network and the moving base stations via the fixed radio ports. The fiber optic rings 55, 75 are preferably continuous rings with an add/drop multiplexer for each ring in the gateway office. Data transmission on the fiber optic rings 55, 75 is preferably in accordance with one of the well-known SONET or synchronous digital hierarchy (SDH) transmission protocols.

The directional antennas 100–105, 110, 111 may be of a sectorized architecture or may be phased array antennas with highly directional radio frequency beams. Such antennas are preferably used to decrease interference between the mobile base stations and the fixed radio ports, allowing greater spectrum reuse. Antenna diversity can be provided with two spatially separated radio beams separated in time with a predefined time-delay offset for easier separation at reception. Various techniques for obtaining high antenna diversity are well known in the art and antennas employing such techniques are commercially available.

Figure 4:
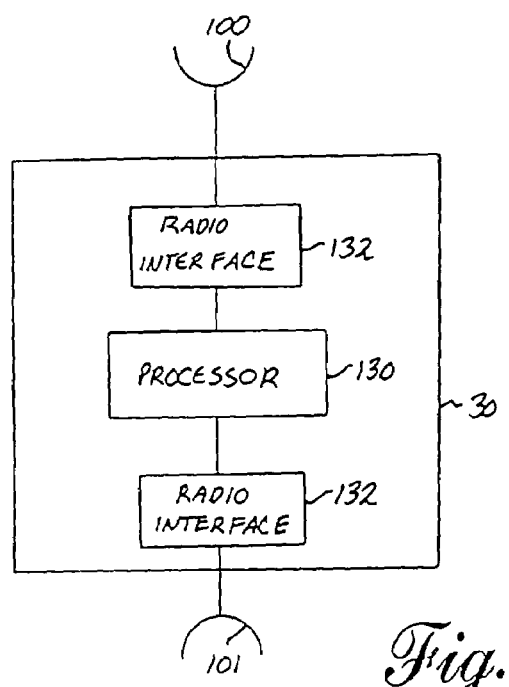
FIG. 4 is a block diagram representation of a moving base station of FIG. 1.
Figure 5:
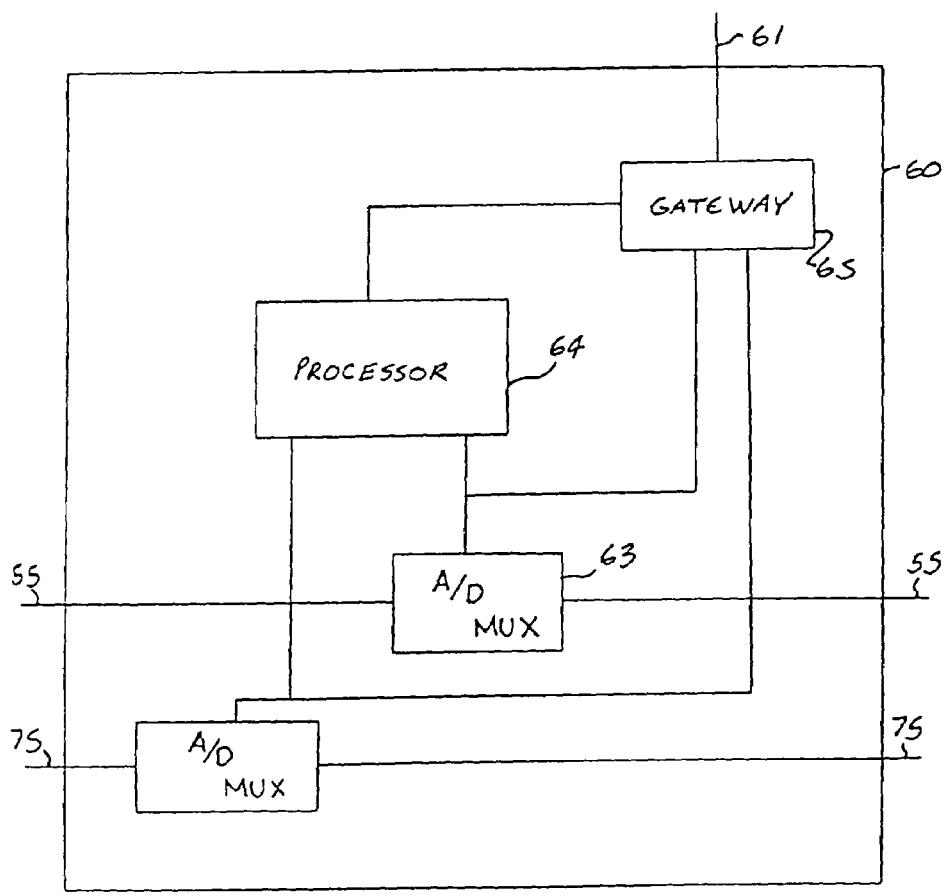
FIG. 5 is a block diagram representation of a gateway telephone office shown in FIG. 1.

FIG. 4 is a block diagram representation of the moving base station 30. The station 30 includes a processor 130 connected via radio interfaces 132, 134 to the antennas 100, 101, respectively. The processor 130 may be a standard microprocessor and the radio interface circuits 132 may be standard radio interface circuits. The microprocessor is preferably programmed to handle the call processing functions performed in a prior art system by a call site or by a shared base station controller. In this manner, the moving base station has greater autonomy and requires less communications with a shared base station controller or the like. The circuits 132, like the radio interface circuits 154 in the fixed radio port 50 and the radio interface circuits 164 in the fixed base station 70, are well known and commercially available circuits.

The radio interface between the mobile units 20, 25 and the moving base stations 30, 40 and the fixed base station 70 is a standard radio interface, well known in the art. The radio interface between the moving base stations 30, 40 and the fixed radio ports 50 is preferably a time division multiplexed, direct-sequence, spread-spectrum, code-division multiple-access interface (TDM/CDMA). Multiple channels between the base station and the fixed radio ports are time division multiplexed as time slots in a data stream. The data stream is spread with a pseudo-random code over the allocated spectrum. A pilot sequence is inserted in the transmitted signal for ease of synchronization in a well-known manner. The interface between the movable base station and the fixed radio port is preferably transparent to the overall system in spectrum use.

Frequency division or time division may be used for duplex communications. In the frequency division duplex (FDD) mode, data is simultaneously transmitted in both directions, each in a different spectrum band. In a typical system in the FDD mode, the TDM frame transmission duration will be approximately 500 microseconds making the interface substantially transparent to overall system delay.

The interface between the mobile unit and the movable base may be the standard IS-95-based PCS air interface standard. The channel capacity for the so-called "extended mode" (2.5 mhz) has been determined to be seven channels at 32 kilobits per second. The FCC allocated licensed spectrum for personal communications services (PCS) includes 10-mhz licenses and 30-mhz licenses. Each 10-mhz license provides two separated 5-mhz bands and each 30-mhz license provides two separated 15-mhz bands, for two-way communications. Two 5-mhz bands can support 14 duplex channels at 32 kilobits per second and two 15-mhz bands can support 42 duplex channels at 32 kilobits per second.

Figure 6:
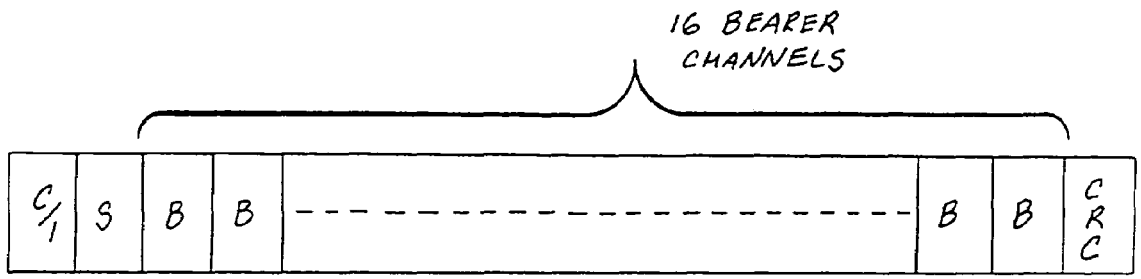
FIG. 6 is a tabular representation of channel allocation.
Figure 7:
FIG. 7 is a representation of selected channels of FIG. 6.

Voice signals between a mobile unit and the gateway office are encoded in a standard fashion using ADPCM voice encoding with a minimum bit rate of 32 kilobits per second in each channel. The interface between the moving base station and the fixed radio port is adapted to carry up to 19 channels of 32 kilobits per second each at 16 bits per time slot. The frame structure includes 16 bearer channels of 32 kilobits per second at 16 bits per time slot. The time division multiplexed frame rate between the movable base station and the fixed radio port is 608 kilobits per second. To achieve a processing gain of 9 decibels, the frame rate is multiplied by a factor of 8, yielding 4,864 kilobits per second, which fit into a single 5-mhz band. FIG. 6 is a tabular representation of the channel allocation showing 16 bearer channels plus 3 channels for signalling, control, and error code. FIG. 7 is a representation of channels 18 and 19 of FIG. 6.

The moving base stations are addressed using predefined code sequences derived in a known manner by the use of Walsh functions. U.S. Pat. No. 5,103,349 entitled "System and Method for Generating Signal Wave Forms in CDMA Cellular Telephone System" describes the use of Walsh functions for code generation. U.S. Pat. No. 5,103,349 is incorporated by reference herein. As described in that patent, by choosing a Walsh function of order 8 provides 8 orthogonal codes in the present embodiment using spread spectrum CDMA uses the all 0 Walsh sequence as a pilot carrier with the other 7 sequences available for moving base station communications. The code sequences may be repeated as ABCDEFG; ABCDEFG; . . . . Although fewer codes could be used, preferably no less than 3 are used. Because of differing propagation times for signals between a particular moving base station and two or more different fixed radio ports, it is not possible to satisfy the condition of time alignment required for Walsh function orthogonality for 2 or more fixed radio ports at one time. For this purpose, two outer pseudonoise codes are used to provide discrimination between signals arriving at the moving base station from different fixed radio ports. The pseudonoise code rate is preferably 4,864 kilobits per second. The sequence length for the transmitted carrier signal is preferably 32,768 chips, as described in U.S. Pat. No. 5,103,459. The outer pseudonoise codes modulate the signal in quadrature phase shift keying.

The pilot signal will be transmitted in both directions, from the moving base stations to the fixed radio ports and vice, versa. This is made possible by the line of site fading characterized as Rician.

The pilot sequence will be long enough that a number of different sequences can be generated by shifts in the basic sequence. The separation will be great enough to ensure that there is no interference between pilot signals. Each moving base stations will use a different offset from a neighboring moving base station to provide signal separation. Similarly, each fixed radio port will use a different offset from a neighboring fixed radio port.

The FCC has allocated a 20 mhz of unlicensed spectrum, including a 10 mhz band for voice products and a 10-mhz band for data products. Thus, one continuous 10-megahertz channel is available and time division multiplex transmission is preferably used. The bit rate for both directions of transmission will be twice the frequency division duplex rate, introducing an overall delay of 500 microseconds and a processing gain of 9 decibels. In the time division duplex mode, the transmission times and direction, forward and reverse between the mobile unit and the moving base station and between the moving base station and the fixed radio ports, are aligned. In one half of the time division, duplex cycle signals are transmitted from the mobile unit to the moving base station and, from there, to the fixed radio port. In the other half-cycle, signals are transmitted from the fixed radio port to the moving base station and then to the mobile unit.

The two 15-mhz licensed spectrum bands (30 mhz) are preferably divided into three 5-megahertz channels in each direction, utilizing the same architecture as described earlier herein with respect to the 5-megahertz licensed spectrum. In the 15-mhz licensed spectrum, each of the 5-megahertz channels will support 14 traffic channels, for a total of 42 traffic channels in each 15-mhz band. The air interface between the moving base station and the fixed radio port, as well as the signal structure, can be modified and adapted to a variety of allocations of spectrum and air interface standards.

In the present embodiment, as described earlier herein, 7 orthogonal codes are available for communication between the fixed radio ports 50 and the moving base stations 30, 40. As described earlier herein and depicted in FIGS. 6 and 7, one 16 bit communication channel, channel 19, is set aside for control and identification bits. As depicted in FIG. 7, channel 19 may comprise 7 control bits and 9 identification bits. The 9 identification bits provide 512 unique identification numbers. Using 7 orthogonal codes and 512 identification numbers, 3,854 moving base stations can be uniquely identified. When the moving base stations are separated by a spacing of 200 feet, the total distance of coverage using the 3,854 moving base stations is approximately 135 miles. FIG. 1 shows a portion of the system with moving base stations moving in opposite directions along oppositely directed roadways and fixed radio ports with dual antennas. Vehicular traffic moving in opposite directions on the same roadway are preferably served by moving base stations on opposite sides of the roadway. Where each roadway has only one-way traffic, the system is preferably disposed between the roadways. In one embodiment of the invention, depicted in FIG. 9, two separate loops 200, 205 are disposed between two separate roadways 206, 208 with the traffic on the roadways indicated by the arrows 207 and 209. The loops 200 and 205 comprise moving base stations 210 and 250, respectively. The base stations, in this embodiment, are moving in the direction indicated by the arrows 201 and 202. Since, as a practical matter, the loops 200, 205 are not of indefinite length, a plurality of loops may be required to cover a desired area. To avoid interruption in communications, the ends of the loops are preferably sufficiently close together, or overlapping, to provide an overlapping area of coverage for mobile units traveling in the area of the loop ends. This will allow one of the mobile stations nearing the end of the loop of which it is a part to hand off the call to a mobile station of the adjacent loop.

Figure 9:
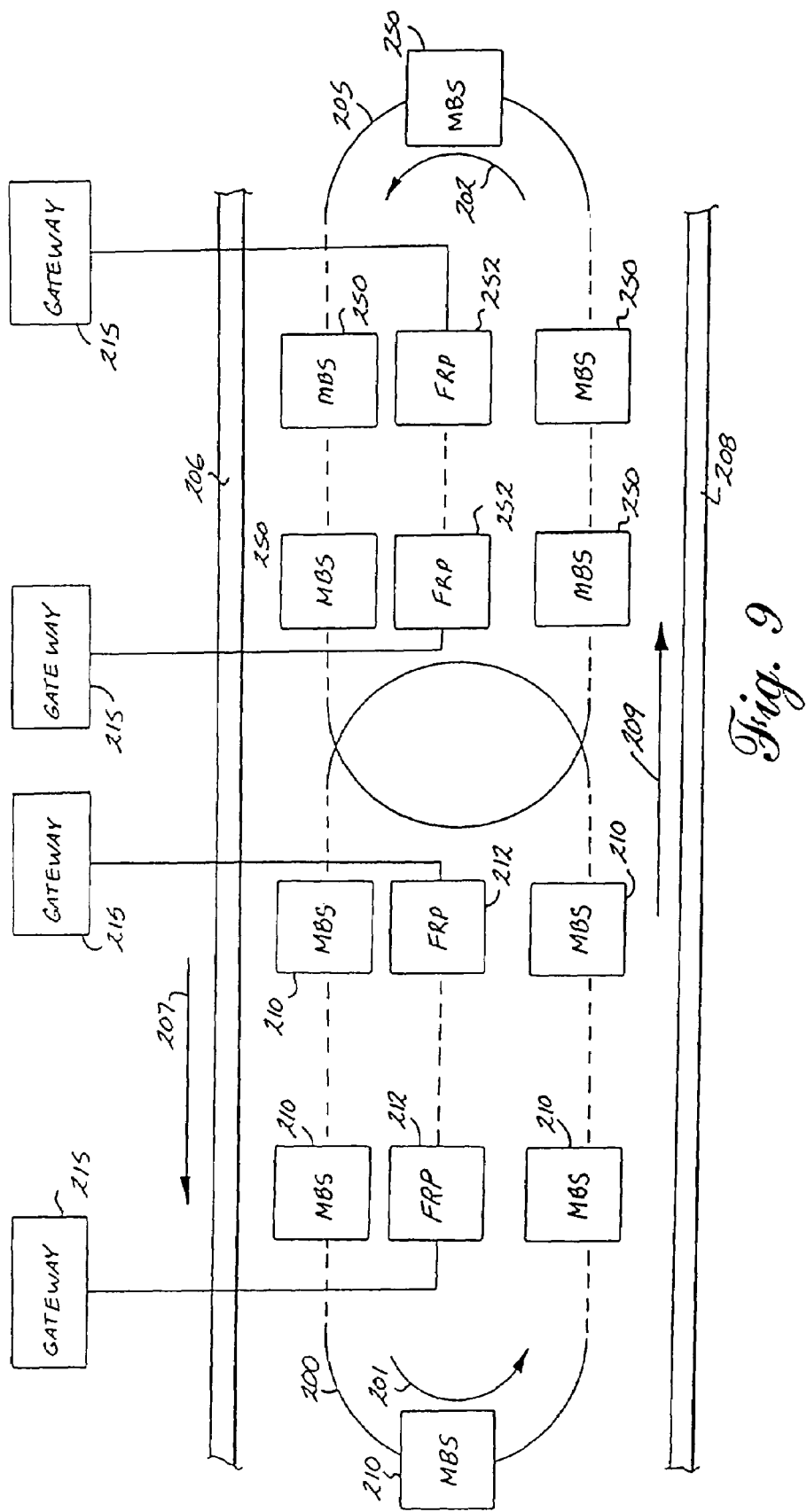
FIG. 9 is a block diagram representation of moving base stations operating in separate loops.

Each loop preferably has a single gateway for connection to the wire telephone network. One advantage of that arrangement is that it eliminates the need for registration of moving base stations, which is required where a moving base station moves between gateways. FIG. 9 shows a pair of gateways 215 associated with the loop 200 and a pair of gateways 255 associated with the loop 205. The two gateways of a loop are both connected to the fixed radio ports of the loop at all times and may be operated in a load sharing mode with each capable of handling the total telecommunication's traffic for the loop in the event of a failure in one of the gateways.

To avoid interrupting communications with a mobile unit traveling along the roadway in the area where two adjacent loops end, any existing calls are handed off from the moving base station near the terminating end of its loop to a moving base station of the next loop. The handoff process is essentially the same as a handoff between moving base stations on the same loop, except that the handed off call will be routed to the wire network to a different gateway. This procedure is equivalent to a handoff between cell sites of different cells in the existing cellular network in a manner which is well known in the art. The loops 200 and 205 may physically overlap to assure proper overlap of communications between moving base stations of the two loops and to avoid loss of communication with a mobile unit handed off from one loop to another.

The timing and synchronization between the moving base station and a fixed radio port with which the moving base station communicates is phase-locked to the pilot signals received from the fixed radio port with which the moving base station communicates. For synchronization purposes, the moving base station will receive a Global Positioning Satellite (GPS) Coordinated Universal Time (UCT) timing signal once each second.

Figure 8:
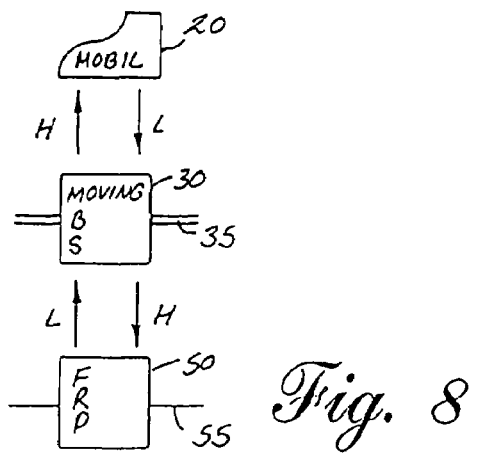
FIG. 8 illustrates signal transmission among the various system entities.

CDMA Technology is well-known for sensitivity to power control. Specifically, the more powerful signals tend to "mask out" less powerful signals at the receiver. Typically, elaborate power control schemes are implemented to ensure that all signals arrive at the receiver at the same level. In accordance with the system of this invention, however, the sensitivity to power level of CDMA is used to advantage. The principles of signal transmission employed in the system of the invention is illustrated in FIG. 8. Two power levels of radio transmission, high (H) and low (L), are defined. Referring to FIG. 1, high-power level signals are transmitted from the moving base station 30 to the mobile unit 20 and from the base station 30 to the fixed radio port 50. Low power level signals are transmitted from the fixed radio port 50 to the moving base station 30. Similarly, low power signals are transmitted from the mobile unit 20 to the moving base station 30. Since the moving base station receives a low power level signal from the fixed radio port and transmits a high level power signal toward terminals, the high power level received at the mobile unit 20 will mask out any signals of the low power signal transmitted from the fixed radio port to the moving base station. In a similar fashion, any low signal transmitted from the mobile unit 20 reaching the fixed radio port 50 will be masked by the high power level signal transmitted from the moving base station to the fixed radio port. As stated earlier, the antennas 100–105, 110, 111 are preferably highly directional antennas with very little feedback from the transmit signal to the receive signal. Feedback due to reflections and other extraneous sources can be readily eliminated at the moving base station using well-known noise cancellation techniques.

When a mobile unit set is first powered up or first enters a service area, the mobile unit must register in the manner described earlier, by transmitting its unique address in the new service area. The address will be received by the closest moving base station 30 and transmitted via a fixed radio port and the gateway switch 60 to the telephone network. This registration procedure is required so that an incoming call for the mobile unit can be appropriately directed.

The spacing of mobile based stations 20 and the fixed radio ports 50 of FIG. 1, together with the strength of the signal transmitted between the moving base stations and the fixed radio ports, determines the number of fixed radio ports with which a moving base station can communicate at any point in time. The spacing and signal strength is preferably such that each fixed radio port receives signals from three moving base stations. When a fixed radio port receives data, accompanied by the identification number of the moving base station, the processor 150 (FIG. 2) computes a signal quality indication on the received signal. The signal quality indication is a figure of merit preferably computed as a function of signal strength and signal-to-noise ratio. It is added to the received data and added to the fiber optic ring 55 via the ADM 152. The gateway 60 preferably receives the same data from several different ones of the fixed radio ports 50 and stores the data in an internal memory in the gateway 60 in association with the moving base station identification number and Walsh function spreading code. The address of the fixed radio port from which the data has been received is stored in the memory of processor 64 as well. Accordingly, multiple copies of the same data transmitted by a single moving base station are stored in the memory of the processor 64 in the gateway. The signal quality indications computed by the processors 150 in each of several fixed radio ports are compared to a predefined signal quality indication threshold, and the data corresponding to a signal quality indication below the threshold value is discarded. Otherwise, the data is retained. A cyclic redundancy code transmitted with the data is used to detect any TDM frame errors. The best data, i.e., associated with the best signal quality indication is transferred from the gateway 60 to the telephone network. Data received from the telephone network at the gateway 60 and intended for a registered mobile unit is stored in the memory of the processor 150 in a register particularly associated with the moving base station currently serving the mobile unit. This data will be sent via the optical ring 55 to all fixed radio ports that are identified in the memory of the processor 65 as fixed radio ports with an acceptable signal quality indication. The received data will be transmitted from each of the fixed radio ports which received the data together with the identification code and Walsh function code of the moving base station to which the data is directed. The transmission of data from different fixed radio ports will be staggered, delayed by different amounts, so that they can be received and separated at the moving base stations. The delays can be precisely controlled by means of synchronous distribution via the optical ring 55, in the SONET or SDH format. The receiving moving base station, by means of its processor 130, compares the multiple copies of the received data signals, aligns them and combines them for the best reception.

Each of the moving base stations will have one of N assigned codes, where N may be any number, but preferably is at least 3 or more. Seven Walsh function codes are preferably used. The codes may be repeated in sequence, as for example, ABCDEFGABCDEFG. The codes are assigned in sequence to the various moving base stations so that two moving base stations having the same code will be physically separated by a sufficient distance to prevent interference in the communications between fixed radio ports and moving base stations having the same identity code. The operation of the fixed base stations 70 is essentially the same as that of a standard fixed base station. In congested traffic areas, a mobile unit which is stopped or slowly moving, e.g., less than 30 miles per hour, will preferably be serviced by one of the fixed base stations 70. As the speed of travel of the mobile unit 20 increases, a handoff will occur between the fixed base station and a moving base station. The procedures for determining whether a mobile unit is to be served by a fixed base station or a moving base station are the same procedures as described earlier herein in determining which moving base station is selected to serve a mobile unit, i.e., based on signal strength and error rate. Thus, when a call involving a mobile unit is initiated or when it is determined that a handoff should occur, the mobile unit may be handed from a moving station to a fixed station, or vice versa. Each mobile unit monitors pilot signals from fixed and moving base stations and synchronizes to the base station providing the best signal. The mobile unit may "connect" with three fixed or moving base stations while searching for a fourth in what is known as the "soft" hand-off mode. As the speed of the vehicle increases, fixed or slow moving base stations will be dropped. In more congested areas where traffic speed will vary between 0 and 60 miles per hour, base stations speed may, for example, be set to move at 30 mph. The moving base station should then be able to accommodate all traffic in the 0–60 mph range.

It will be understood that the above-described arrangement is merely illustrative of the application of the principles of the invention and that other arrangements may be devised by those skilled in the art without departing from the scope of the invention as defined by the appended claims.

I claim:

1. An apparatus comprising:
a receiver configured to wirelessly receive a received signal; and
a transmitter configured to transmit a transmit signal corresponding to the received signal to a mobile unit while the transmitter has a motion relative to Earth along a predetermined path and in accordance with an anticipated motion of the mobile unit, wherein an actual motion of the mobile unit is independent of the motion of the transmitter.

2. An apparatus in accordance with claim 1 wherein the predetermined path has a contour corresponding to a roadway contour and the anticipated motion of the mobile unit is on the roadway.

3. An apparatus in accordance with claim 2, wherein the transmitter is further configured to travel on a conveyor device along the predetermined path.

4. An apparatus in accordance with claim 3, wherein the received signal is received from a fixed radio port.

5. An apparatus comprising:
a receiver configured to receive a received signal from a mobile unit while the receiver has a motion relative to Earth along a predetermined path and in accordance with an anticipated motion of the mobile unit, wherein an actual motion of the mobile unit is independent of the motion of the receiver; and
a transmitter configured to wirelessly transmit a transmit signal corresponding to the received signal to at least one fixed port.

6. An apparatus in accordance with claim 5 wherein the predetermined path has a contour corresponding to a roadway contour and the anticipated motion of the mobile unit is on the roadway.

7. An apparatus in accordance with claim 6, wherein the receiver is further configured to travel on a conveyor device along the predetermined path.

8. A movable base station configured to establish a communication link between a fixed port and mobile unit while the movable base station has a motion relative to Earth along a predetermined path and in accordance with an anticipated motion of the mobile unit, the communication link comprising a wireless communication link between the movable base station and the fixed port, wherein an actual motion of the mobile unit is independent of the motion of the movable base station.

9. A movable base station in accordance with claim 8, wherein the motion of the movable base station is based, at least in part, on a speed of the mobile unit.

10. A movable base station in accordance with claim 9, wherein the motion of the movable base station is based, at least in part, on a speed of another mobile unit.

11. A movable base station in accordance with claim 9, wherein the motion of the movable base station is based, at least in part, on a received signal strength of a signal transmitted by the mobile unit.

12. A movable base station in accordance with claim 11, wherein the motion of the movable base station is based, at least in part, on another received signal strength of another signal transmitted by the another mobile unit.

13. A movable base station configured to have a motion relative to a fixed port along a predetermined path and in accordance with an anticipated motion of a mobile unit, comprising:
a first radio interface configured to establish a first wireless communication link between the movable base station and the mobile unit; and
a second radio interface configured to establish a second wireless communication link between the movable base station and the fixed port, wherein an actual motion of the mobile unit is independent of the motion of the movable base station.

14. A movable base station in accordance with claim 13, wherein the first communication link and the second communication are established within a frequency band having a lower limit greater than 300 megahertz.

15. A movable base station in accordance with claim 14, wherein the frequency band has a lower limit of 300 megahertz.

16. A movable base station in accordance with claim 14, wherein the frequency band is an optical frequency band.

17. A movable base station in accordance with claim 14, wherein the frequency band is a millimeter wave frequency band.

18. A movable base station in accordance with claim 17, wherein the frequency band comprises a frequency spectrum from 50 gigahertz to 70 gigahertz.

19. A movable base station in accordance with claim 17, wherein the frequency band is an oxygen absorption frequency band.

20. A movable base station in accordance with claim 13, wherein the predetermined path has a contour corresponding to a roadway contour and the anticipated motion of the mobile unit is on the roadway.

21. A movable base station in accordance with claim 20, wherein the movable base station is further adapted to travel on a conveyor device along the predetermined path.

22. An apparatus adapted to move in accordance with a movement of a mobile unit moving relative to a plurality of fixed radio ports, the apparatus comprising:

a receiver adapted to receive a plurality of signals, each of the plurality of signals transmitted from each of the plurality of fixed radio ports within a frequency band having a lower limit greater than 300 megahertz;

a transmitter adapted to transmit, within the frequency band, a resultant signal to the mobile unit in accordance with at least one of the plurality of signals; and a processor adapted to maximize an amount of transferred information to the mobile unit by evaluating a quality of each of the plurality of signals transmitted from the plurality of fixed radio ports.

23. An apparatus in accordance with claim 22, wherein the frequency band has a lower limit of 300 megahertz.

24. An apparatus in accordance with claim 22, wherein the frequency band is an optical frequency band.

25. An apparatus in accordance with claim 22, wherein the frequency band is a millimeter wave frequency band.

26. An apparatus in accordance with claim 25, wherein the frequency band comprises a frequency spectrum from 50 gigahertz to 70 gigahertz.

27. An apparatus in accordance with claim 25, wherein the frequency band is an oxygen absorption frequency band.

28. An apparatus in accordance with claim 22, wherein the processor is further adapted to determine a best fixed radio port of the plurality of fixed radio ports, the best fixed radio port enabling the maximization of the amount of transferred information to the mobile unit.

29. An apparatus in accordance with claim 28, wherein the transmitter is further adapted to transmit the resultant signal in accordance with the signal transmitted from the best fixed radio port.

30. An apparatus in accordance with claim 29, wherein the processor is further adapted to determine a plurality of best fixed radio ports and to combine a group of signals of the plurality of signals to produce the resultant signal, the group of signals transmitted from the plurality of best fixed radio ports.

31. An apparatus in accordance with claim 30, wherein the processor is further adapted to combine the group of signals by synchronizing the group of signals to produce a plurality of synchronized signals and combining the plurality of synchronized signals in accordance with the quality of each of the plurality of synchronized signals to produce the resultant signal.

32. An apparatus in accordance with claim 22, wherein the amount of information transferred to the mobile unit is maximized by transmitting the information through at least one of the plurality of fixed radio ports, the at least one fixed radio port providing a greatest quality communication link between the at least one fixed radio port and the mobile unit in relation to other communication links between other fixed radio ports of the plurality of fixed radio ports and the mobile unit.

33. An apparatus in accordance with claim 32, wherein the greatest quality communication link comprises:

a first wireless communication link between the at least one fixed radio port and the receiver; and a second wireless communication link between the transmitter and the mobile unit.

34. An apparatus adapted to move in accordance with a movement of a plurality of mobile units moving relative to a plurality of fixed radio ports at a velocity greater than a relative velocity of movement between each of the mobile units of the plurality of mobile units, the apparatus comprising:

a first radio interface adapted to communicate with the plurality of fixed radio ports in a frequency band;

a second radio interface adapted to communicate with the plurality of mobile units in the frequency bandwidth, the frequency having a lower limit greater than 300 megahertz; and a processor adapted to establish a communication link between the plurality of mobile units and at least one of the plurality of fixed radio ports based on a plurality of signal quality indicators, each of the signal quality indicators corresponding to each of a plurality of transmitted signals transmitted from the plurality of fixed radio ports.

35. An apparatus in accordance with claim 34, wherein the frequency band has a lower limit of 300 megahertz.

36. An apparatus in accordance with claim 34, wherein the frequency band is an optical frequency band.

37. An apparatus in accordance with claim 34, wherein the frequency band is a millimeter wave frequency band.

38. An apparatus in accordance with claim 37, wherein the frequency band comprises a frequency spectrum from 50 gigahertz to 70 gigahertz.

39. An apparatus in accordance with claim 37, wherein the frequency band is an oxygen absorption frequency band.

40. An apparatus in accordance with claim 34, wherein the processor is further adapted to establish a second communication link between the plurality of mobile units and at least a second fixed radio port of the plurality of fixed radio ports based on the plurality of signal quality indicators.

41. An apparatus in accordance with claim 40, wherein the apparatus is further adapted to move along a predetermined path between the plurality of mobile units and the plurality of fixed radio ports.

42. A method of transmitting a signal to a mobile unit having an anticipated motion relative to Earth, the method comprising the steps of:

wirelessly receiving a received signal;

controlling a motion of a transmitter along a predetermined path in accordance with the anticipated motion of the mobile unit, wherein the motion of the mobile unit is independent of the motion of the transmitter; and transmitting a transmit signal corresponding to the received signal to the mobile unit.

43. A method in accordance with claim 42, wherein the step of controlling comprises the steps of:

moving the transmitter along a conveying device deposited along the predetermined path; and adjusting a speed of the transmitter in accordance with the motion of the mobile unit.

44. A method in accordance with claim 43, wherein the step of adjusting comprises the steps of:

observing a relative motion between the mobile unit and the transmitter; and adjusting the speed of the transmitter to minimize the relative motion between the mobile unit and the transmitter.

45. A method in accordance with claim 44, wherein the step of moving the transmitter comprises the steps of:

moving the transmitter next to a roadway;

calculating an average speed of a plurality of mobile units traveling along the roadway; and adjusting the speed of the transmitter in accordance with the average speed.

46. A method of wirelessly transmitting a transmit signal corresponding to a received signal transmitted from a mobile unit having an anticipated motion relative to Earth, the method comprising the steps of:

controlling a motion of a receiver along a predetermined path in accordance with the anticipated motion of the mobile unit, wherein the motion of the mobile unit is independent of the motion of the receiver;
receiving the received signal at the receiver; and
wirelessly transmitting the transmit signal from a transmitter connected to the receiver.

47. A method in accordance with claim 46, wherein the step of controlling comprises the steps of:
moving the receiver along a conveying device deposited along the predetermined path; and
adjusting a speed of the receiver in accordance with the motion of the mobile unit.

48. A method in accordance with claim 47, wherein the step of adjusting comprises the steps of:
observing a relative motion between the mobile unit and the receiver; and
adjusting the speed of the receiver to minimize the relative motion between the mobile unit and the receiver.

49. A method in accordance with claim 48, wherein the step of moving the receiver comprises the steps of:
moving the receiver next to a roadway;
calculating an average speed of a plurality of mobile units traveling along the roadway; and
adjusting the speed of the receiver in accordance with the average speed.

50. A method of providing a communication link between a communication network and a mobile unit having a motion relative to a plurality of fixed ports, wherein the plurality of fixed ports are communicatively coupled to the communication network, the method comprising the steps of:
moving a movable base station in accordance with the motion of the mobile unit;
receiving a plurality of signals at the movable base station, each of the plurality of signals transmitted from each of the plurality of fixed radio ports within a frequency band having a lower limit greater than 300 megahertz;
transmitting, within the frequency band, a resultant signal to the mobile unit in accordance with at least one of the plurality of signals; and
maximizing an amount of transferred information to the mobile unit by evaluating a quality of each of the plurality of signals transmitted from the plurality of fixed radio ports.

51. An apparatus in accordance with claim 50, wherein the frequency band has a lower limit of 300 megahertz.

52. An apparatus in accordance with claim 50, wherein the frequency band is an optical frequency band.

53. An apparatus in accordance with claim 50, wherein the frequency band is a millimeter wave frequency band.

54. An apparatus in accordance with claim 50, wherein the frequency band comprises a frequency spectrum from 50 gigahertz to 70 gigahertz.

55. An apparatus in accordance with claim 50, wherein the frequency band is an oxygen absorption frequency band.

56. A method of providing a communication connection between a communication network and a plurality of mobile units having a motion relative to a plurality of fixed ports, wherein the plurality of fixed ports are communicatively coupled to the communication network, the method comprising the steps of:
establishing a first communication link between the plurality of mobile units and a first fixed port of the plurality of fixed ports through a movable base station having a motion in accordance with the motion of the mobile units; and
simultaneously handing off the plurality of mobile units to a second fixed port of the plurality fixed ports.

57. A method in accordance with claim 56, wherein the step of simultaneously handing off the plurality of mobile units comprises the steps of:
combining a first incoming signal transmitted from the first fixed port and a second incoming signal transmitted from the second fixed port to produce a resultant signal; and
transmitting the resultant signal to the plurality of mobile units from the movable base station.

58. A method in accordance with claim 57, wherein the step of combining comprises the steps of:
determining a first quality of the first signal;
determining a second quality of the second signal; and
adding the first signal to the second signal in accordance with the first quality and the second quality.

59. A method in accordance with claim 58, wherein the step of adding comprises the step of minimizing a contribution of the first signal to the resultant signal by ignoring the first signal.

60. A communication system comprising:
a first transceiver configured to provide a moving communication cell to a mobile unit while the moving communication cell has a motion relative to Earth along a predetermined path and in accordance with an anticipated motion of the mobile unit, wherein an actual motion of the mobile unit is independent of the motion of the moving communication cell; and
a second transceiver connected to the first transceiver and configured to wirelessly exchange signals with at least one fixed port corresponding to the communication cell.

61. A communication system in accordance with claim 60 wherein the predetermined path has a contour corresponding to a roadway contour of a roadway and the anticipated motion of the mobile unit is along the roadway.

62. A communication system in accordance with claim 61, comprising a moving base station adapted to provide the moving communication cell.

63. A communication system in accordance with claim 62, further comprising a plurality of fixed ports disposed along the anticipated path of the mobile unit, the plurality of fixed ports in communication with the moving base station.

64. A communication system in accordance with claim 63, further comprising a gateway connected to the plurality of fixed ports.

65. A method of providing communication services to a mobile unit, the method comprising:
providing a moving communication cell to a mobile unit while the moving communication cell has a motion relative to Earth along a predetermined path and in accordance with an anticipated motion of the mobile unit, wherein an actual motion of the mobile unit is independent of the motion of the cell; and
wirelessly exchanging signals with at least one fixed port corresponding to the communication cell.

66. A method in accordance with claim 65, wherein the predetermined path has a contour corresponding to a roadway contour of a roadway and the anticipated motion of the mobile unit is along the roadway.

67. A method in accordance with claim 66, wherein the providing the moving communication cell comprises:

providing the moving communication cell from a moving base station.

68. A method in accordance with claim 67, wherein the providing the moving communication cell comprises:
exchanging fixed port signals between the moving base station and at least one fixed port of a plurality of fixed ports disposed along the anticipated path of the mobile unit.

69. A method in accordance with claim 68, wherein the providing the moving communication cell further comprises:
exchanging mobile unit signals between the moving base station and the mobile unit, the fixed port signals corresponding to the mobile unit signals.

* * * * *